(12) United States Patent  
Khain

(10) Patent No.: US 8,064,084 B2  
(45) Date of Patent: Nov. 22, 2011

(54) DISTRIBUTED PROCESSING OF PRINT JOBS

(75) Inventor: Leonid Khain, Herzliya (IL)

(73) Assignee: Eastman Kodak Company, Rochester, NY (US)

( * ) Notice: Subject to any disclaimer, the term of this patent is extended or adjusted under 35 U.S.C. 154(b) by 903 days.

(21) Appl. No.: 12/060,910

(22) Filed: Apr. 2, 2008

(65) Prior Publication Data

US 2009/0251718 A1   Oct. 8, 2009

(51) Int. Cl.
*G06F 3/12* (2006.01)
*H04N 1/32* (2006.01)

(52) U.S. Cl. .............................. 358/1.15; 358/468

(58) Field of Classification Search .................. 358/501, 358/1.13, 1.15, 1.4, 1.6, 2.1, 3.01, 3.24, 504, 358/530, 468
See application file for complete search history.

(56) References Cited

U.S. PATENT DOCUMENTS

| | | | |
|---|---|---|---|
| 5,287,194 A * | 2/1994 | Lobiondo | 358/296 |
| 5,333,246 A | 7/1994 | Nagasaka | |
| 5,978,563 A * | 11/1999 | Kawamoto et al. | 358/1.17 |
| 6,295,134 B1 | 9/2001 | Hughes | |
| 6,709,176 B2 * | 3/2004 | Gotoh et al. | 400/61 |
| 6,941,865 B2 * | 9/2005 | Kato | 101/484 |
| 6,970,261 B1 * | 11/2005 | Robles | 358/1.15 |
| 7,139,085 B1 * | 11/2006 | Sakaguchi | 358/1.15 |
| 7,304,760 B2 * | 12/2007 | Ferlitsch | 358/1.15 |
| 7,359,081 B2 * | 4/2008 | Wanda et al. | 358/1.15 |
| 7,505,172 B2 * | 3/2009 | Vondran et al. | 358/1.9 |
| 2002/0041386 A1 * | 4/2002 | Suzuki et al. | 358/1.13 |
| 2002/0113989 A1 * | 8/2002 | Ferlitsch et al. | 358/1.15 |
| 2002/0184342 A1 * | 12/2002 | Kennedy et al. | 709/219 |
| 2003/0007818 A1 * | 1/2003 | Kato | 400/61 |
| 2003/0193683 A1 | 10/2003 | Motamed et al. | |
| 2005/0146742 A1 * | 7/2005 | Gregory | 358/1.15 |
| 2006/0164679 A1 * | 7/2006 | Kim et al. | 358/1.15 |
| 2007/0236741 A1 | 10/2007 | Tai et al. | |
| 2010/0091723 A1 * | 4/2010 | Park et al. | 370/329 |

FOREIGN PATENT DOCUMENTS

EP   1274005   * 1/2003

* cited by examiner

*Primary Examiner* — Jerome Grant, II
(74) *Attorney, Agent, or Firm* — Nelson Adrian Blish

(57) ABSTRACT

A method and apparatus for distribution of a print job for digital printing by distributing elements of the print job between a plurality of processing means. The method and apparatus includes receiving a common job file (CJF) (41). Splitting the common job file into plurality of CJF chunks (74) wherein the number of the CJF chunks will be generated in accordance of availability of the processing means (42). Distributing the CJF chunks to the processing means for processing and generating a plurality of ready-to-print pages (RTP) (14) pages. Sending said generated plurality of RTP pages to a digital printer (52) by adhering to the page order of the print job.

17 Claims, 5 Drawing Sheets

DISTRIBUTED PROCESSING OF PRINT JOBS

CROSS REFERENCE TO RELATED APPLICATIONS

Reference is made to commonly-assigned U.S. patent application Ser. No. 11/858,477, filed Sep. 20, 2007, now U.S. Publication No. 2009/0080025, and entitled PARALLEL PROCESSING OF PAGE DESCRIPTION LANGUAGE, by Aronshtam et al., the disclosure of which is incorporated herein.

FIELD OF THE INVENTION

The present invention relates to methods and apparatus for efficient distribution of page description language (PDL) objects among processors for a digital front end system in order to provide digital data required for high speed digital printers conforming to printers speed needs.

BACKGROUND OF THE INVENTION

Digital frontends or color print servers geared to prepare data and drive digital printers can be described in general terms by two major parts as is depicted in FIG. 1:
1. A frontend element 11 processes digital files in a form of a page description language (PDL) 13, such as, for example, PostScript (PS). The frontend element 11 is equipped with PDL processing means, and the output of the processing means is data 14 in a ready-to-print (RTP) form.
2. A backend element 12 receives the RTP data and sends it to a digital printer for printing via a video interface 15 to the printer.

Most of color print servers produce the RTP data buffers in line with the print engine, in other words, the data that is generated by the frontend 11 is immediately consumed by the backend 12, without a step of generating RTP objects and saving them on an intermediate storage for further printing. One line of commercial color print services uses the above method of intermediate RTP generation, and defines a special RTP format and a data flow based on the RTP format. The RTP format consists of reusable as well as from non-reusable elements which are represented as separate RTP elements.

Frontend 11 receives incoming PDL jobs in, for example, a page definition file (PDF), PS or variable PostScript (VPS). Frontend 11 processes the jobs, and converts the PDL to RTP jobs. Backend 12 merges and assembles the RTP elements into page-bitmaps and outputs the bitmaps to the printer using a video interface 15.

The use of intermediate saved RTP format is to better for meeting the digital printer's engine speed. For non-variable data printing (VDP) jobs, multiple copies are printed at the engine speed. This is achieved by preparing the RTP once and printing the RTP multiple times. In the case of typical VDP jobs, the RTP is prepared at engine speed.

The strict division between the frontend and the backend elements when designing an interface to new printer is a very important. The frontend is a printer-independent part and typically requires limited customization, while the backend is a printer-dependent part and typically requires specific customization to accommodate specific printer needs. FIG. 2 is a top-level view of a typical commercial color print server illustrating the separation between the frontend 11 and the backend 12 as discussed above.

An important element in the printer color server architecture is the merger and printer interface boards 28. A merger-board merges and assembles RTP elements in real-time at the engine speed. The rest of the system can be viewed as a production line and its main purpose is to produce a plurality of RTP object in order to feed the merger-boards. This view of the system is convenient, however, other alternative views are possible as well.

RTP format is a proprietary format of the Eastman Kodak Company for ripped jobs. According to this format, a ripped job consists of RTP pages and each page refers to RTP elements. RTP is an element-based format and rendered reusable and non-reusable elements are represented as separate RTP elements. Each RTP element can be viewed as a compressed raster-element. RTP is prepared accordingly to accommodate the specifics of the fusion cards and engine characteristics.

Processing frontend 11 consists of the following main components:
  Job input 22, responsible for importing jobs to the system;
  Raster image processor (RIP) 23;
  Image processing components 24 for transformations of raster data produced by RIP 23;
  RTP preparation module 25.

As described above, the frontend 11 receives incoming PDL jobs 13 and converts them to RTP format 14. PDL-to-RTP is a multi-step operation that consists of the following processing steps:
 1. The job is received and imported to the system.
 2. The job is scheduled for processing.
 3. The pipelined job processing starts by RIP 23, image processing 24 such as trapping and anti-aliasing.
 4. RTP preparation module 25 transforms the final raster-data to RTP format 14.
 5. RTP format 14 is further stored to RTP storage 26.

All the above steps are performed in pipelined fashion. For example, trapping may start after a few raster scanlines are RIPed and RTP creation may start after a few raster scanlines on the page are prepared.

Printing backend 12 consists of the following components:
 1 RTP storage 26—an efficient raster-element storage that guarantees reading of raster-elements at print engine speed. RTP storage is typically implemented as a fast disk or a disk-array. This enables a large storage capacity at high-speeds as dictated by the engine speed.
 2. Data feeder 27—a component that schedules work for merger card/cards. It is responsible for loading RTP layout, initiating merge operations, and monitoring merge process.
 3. Merger boards 28—the components responsible for merging and assembling RTP elements into final page-bitmaps and sending said bitmaps to the print engine.

As described above the backend 12 is responsible for printing RTP data at the engine speed. This includes the following operations:
 1. Reading RTP-data from RTP-storage.
 2. Merging and assembling RTP-data into contone page-bitmaps.
 3. Additional processing (screening, compression, and look-up table transformation (LUT)) might be applied to contone bitmaps according to engine specification.
 4. Outputting bitmaps via the printer video interface 15 to the print engine.
 5. Controlling the engine.

The main operations performed by the backend are the operations of merging and assembling of RTP data to the resulting bitmaps. Though the merging process can be implemented either in software or in hardware, typically the merger is implemented in hardware in order to meet printer engine speed.

According to the performance requirements, there could be a single merger board or multiple merger boards in the system. In a printer color server equipped with a single merger board 28, the board will handle all the process colors (e.g. Cyan (C), Magenta (M), Yellow (Y) and Black (K)). In a printer color server equipped with multiple merger boards each board can be responsible for one or more process colors. For example, in the case of two merger boards 28, one board will handle C and M color channels 53 whereas the other board will handle Y and K colors.

The requirements of color digital printers are getting more and more demanding. Printers capable of printing one hundred A4 color pages per minute (100 ppm) are already available. Printers that will print more than 1000 ppm will be introduced in the near future. The current architecture of color servers is not capable to drive the high speed printers at the required speed and there is a need to reengineer the process to meet the new requirements.

SUMMARY OF THE INVENTION

Briefly, according to one aspect of the present invention a method for distribution of a print job for digital printing is accomplished by distributing elements of the print job between a plurality of processors. According to the method a print job reference file and composition requirements are provided. The print job reference file is processed according to the job composition requirements. The print job reference file is split into plurality of segments wherein the segments are generated in accordance with the availability of the processing means. The segments are distributed to the processing means, which generates a plurality of ready to print elements. A ready-to-print (RTP) pages structure is generated according to the job composition requirements and the plurality of ready to print elements. Printer specific data is created according to the generated ready-to-print (RTP) pages structure and sent to the digital printer.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Achieving high-speed personalized printing complying with printing speeds in the realm of 1,000 ppm requires substantially more processing power than is needed for a conventional system, which will typically consists of a single RIP-Node and a single merger-node. This required processing power calls for much stronger frontend 11 and backend 12 than are available today. Therefore, multiple RIP-Nodes and multiple RTP merger-nodes are needed to achieve the speed required for serving high-speed printers.

Figure 1:
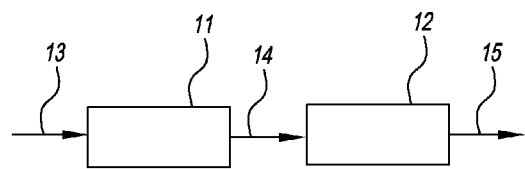
FIG. 1 is a schematic illustrating a simplified commonly used print color servers architecture.
Figure 2:
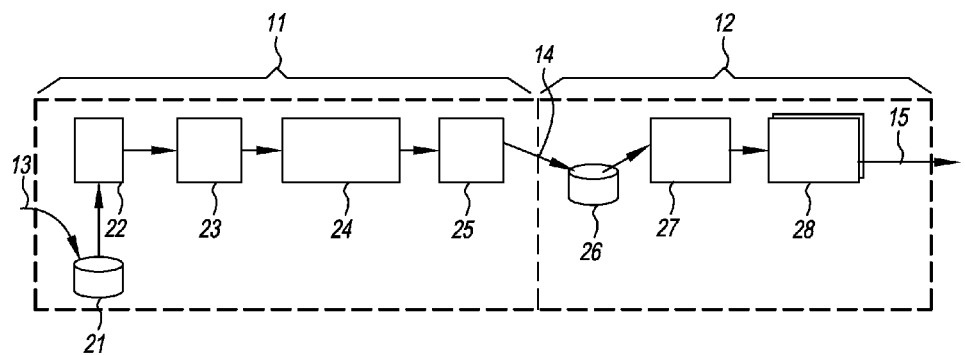
FIG. 2 is a schematic illustrating a detailed print color servers architecture.
Figure 3:
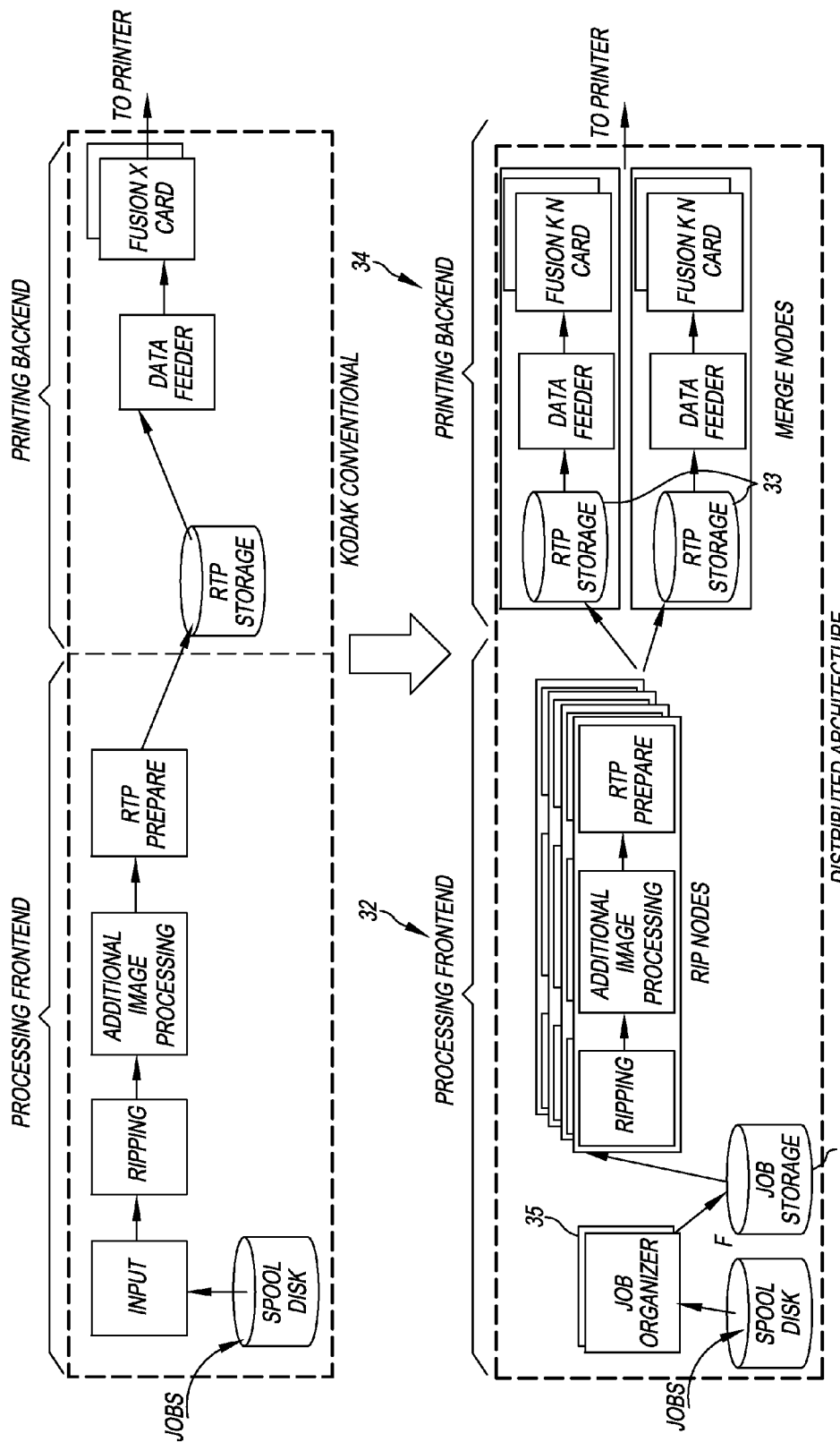
FIG. 3 is a schematic illustrating evolution from current print color servers architecture to an architecture according to the present invention.

The print color server architecture available today needs to be boosted up in order to cope with the new requirements mentioned. FIG. 3 describes a top-level view of current system architecture and system architecture according to the present invention, illustrating the main new components that are used in order to achieve the new goal. The new distributed architecture print color server architecture includes new components as well as a plurality of backend 34 and frontend 32 components.

A job organizer 35 is capable of generating a print job reference file or a common job file (CJF) representation of the incoming PDL jobs 13. The resulted CJF components are stored for intermediate storage in job storage 31. The CJF is a special format that references to an original job and allows page-parallelism. The CJF format is described in detail in the commonly-assigned copending U.S. patent application Ser. No. 11/858,477, filed Sep. 20, 2007, and entitled PARALLEL PROCESSING OF PAGE DESCRIPTION LANGUAGE, by Aronshtam et al.

In order to meet the desired print engine speed a multiple job organizer 35 is deployed. The multiplicity of each component is different and serves different purposes.

a. Multiple job organizers 35 are used to create CJFs for multiple jobs, thus reducing startup time for each job.
 b. Multiple frontend nodes 32 and more specifically the RIP-nodes are primarily used to prepare RTP, typically for all color separation channels, of a single job using page-parallelism. This speed up data preparation needed for achieving the engine speed.
 c. Multiple backend nodes and more specifically merge-nodes are required to merge RTP and output the generated bitmap data via the printer video interface 15 at the engine speed.

As with the conventional architecture, there is a strict separation between frontend 11 and backend 12. Multiple frontend nodes 32 prepares RTP and outputs it to the distributed RTP storages 33. Multiple backend nodes 34 feed data from RTP storages 33, merges the data, and outputs bitmaps to the printer.

Figure 4:
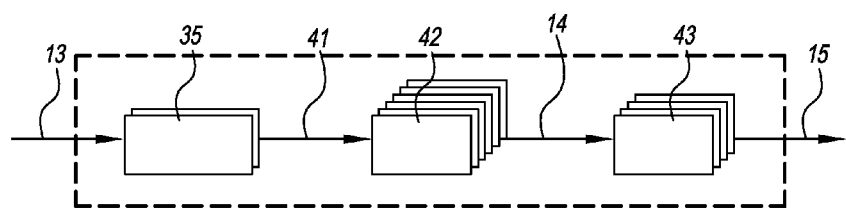
FIG. 4 is a schematic illustrating a simplified print color servers architecture according to the present invention.

Few diagrams in the following description explain the system and the data flow in the system. FIG. 4 depicts a simplified diagram illustrating the main elements of the architecture for the present invention. The simplified diagram described in FIG. 4 shows major system components: organizers, rips, and mergers. The diagram depicts for example a typical high-end system that contains two organizers, eight RIPs, and four mergers.

It is important to emphasize that the diagram shows a schematic layout of the system, however, implementation may vary in different embodiments. For example, each RIP node 42 may reside on a separate computer, or each computer may have two RIP-nodes. Additionally, each multiple merger 43 may reside on a separate computer, or each computer may host two mergers.

Figure 5:
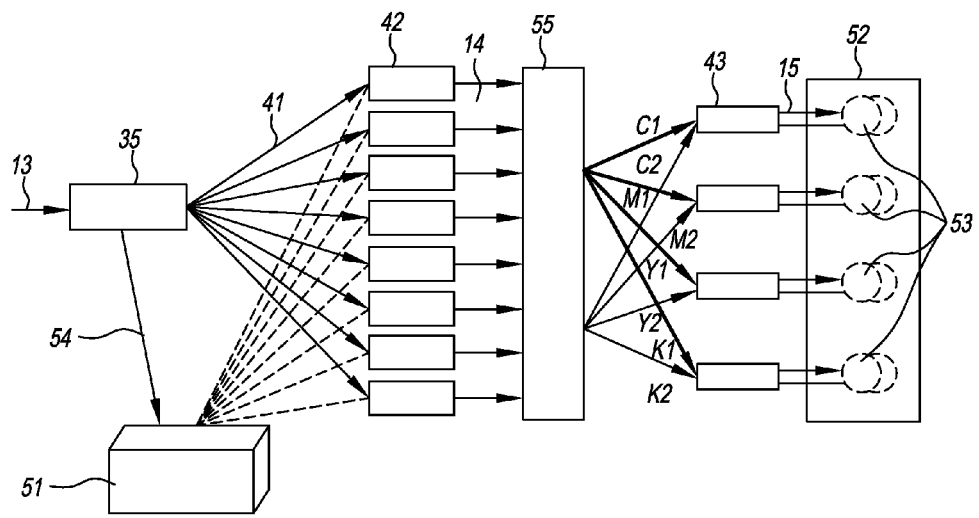
FIG. 5 is a schematic illustrating data flow within the architecture according to the present invention.
Figure 6:
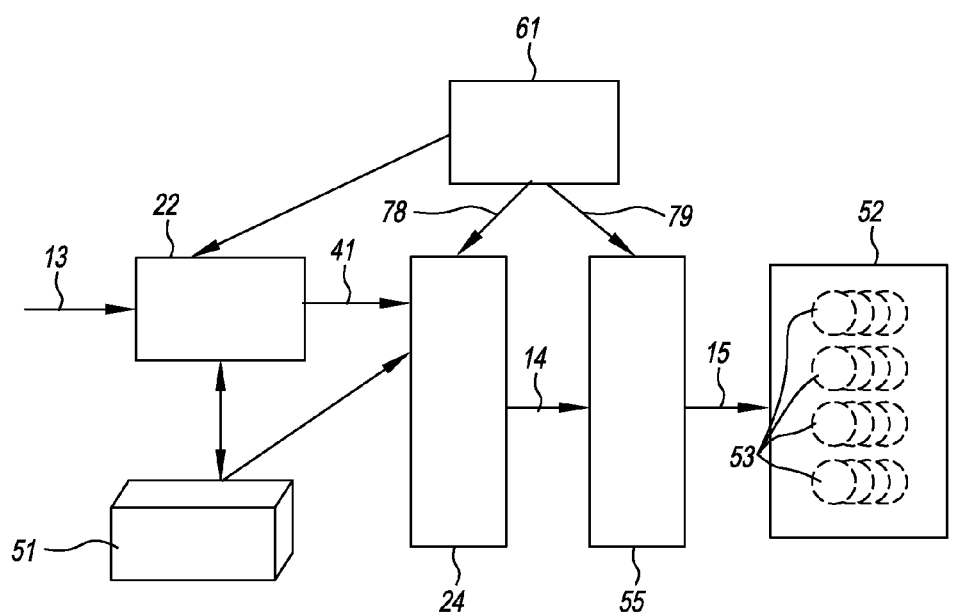
FIG. 6 is a schematic illustrating processing stages within the architecture according to the present invention.

FIG. 5 describes the flow of data within the system according to the present invention. FIG. 6 depicts the stages of data processing in the system and FIG. 7 describes the data flow from job input through process to print.

Figure 7:
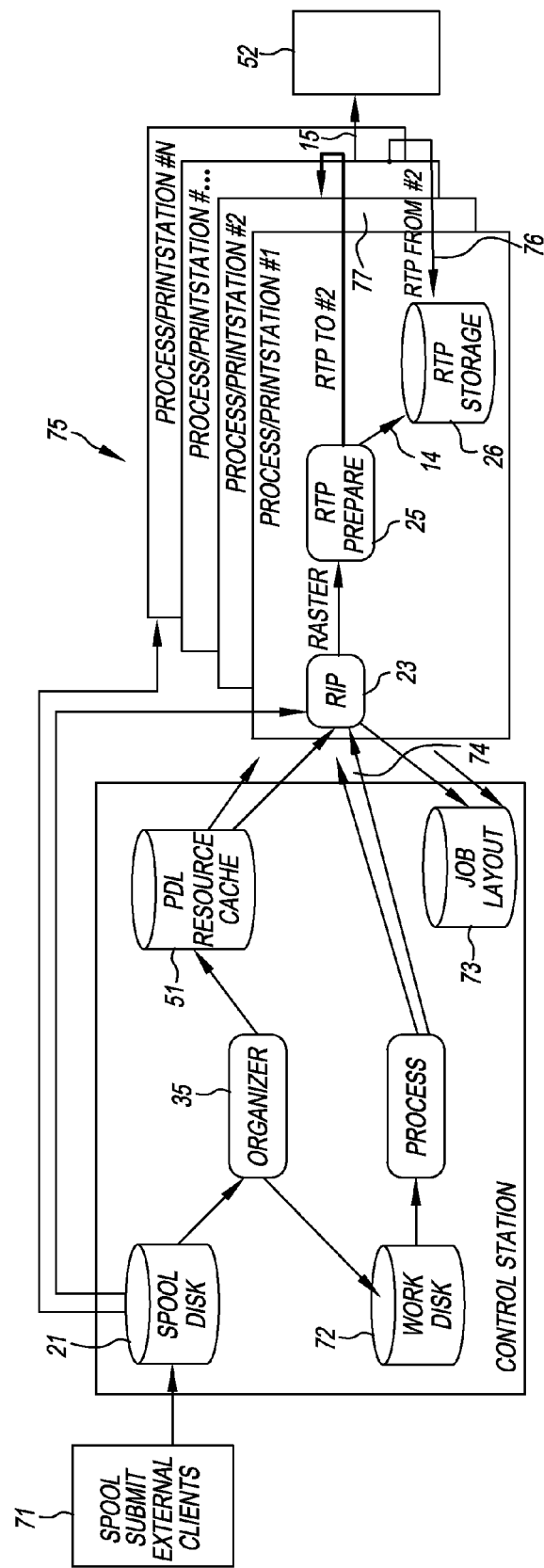
FIG. 7 is a schematic illustrating data flow from input through process to print.

Referring to FIGS. 5-7 print jobs in a PDL form are spooled into spool disk 21 by submission of external clients 71. Input stage 22 prepares the job for further processing (ripping) and organizing it to CJF 41. This includes the following steps: job organizers 35 will read PDL job 13 from spool disk 21 and will parse PDL job 13 and will create a CJF 41 representation, in addition, filtering out of PDL elements 54 and storing them into PDL resource cache 51 will take place. The created CJF 41 will be stored on work disk 72.

An important part of PDL organizing or CJF creation is the production of a job-skeleton, a simple job structure that contains basic information about a job, including job information such as number of documents in a job, number of pages in each document, and page size of each page. The job-skeleton information is used, for making appropriate page imposition instructions created by composition engine 61, including rules information and imposition information, as well as proper page distribution to multiple RIP nodes 42.

The process step prepares the job for printing by converting it to RTP 14. This includes at least the activities described hereunder:

1. Process step reads CJF 41 which includes the job-skeleton from work disk 72.
2. CJF 41 is divided into segments or CJF chunks 74 and the CJF chunks 74 are divided to conform to the load balancing algorithm used in the system to best utilize the available processing means. A CJF chunk includes mostly reference file information such as job metadata and references to job data is light-weight in nature, and therefore is suitable to be effectively distributed among the processing means.
3. CJF chunks 74 are distributed to multiple RIP nodes 42 for processing.
4. Each RIP 23 is responsible for preparing raster data. This includes the following steps:
   a. RIP 23 receives CJF chunk. RIP acquires job data and processes it element-by-element producing raster.
   b. When a new reusable element is encountered that was not already rasterized, it will be rasterized and stored in the local PDL resource cache 51, thus assuring that each PDL element 54 is accessed remotely only once.
   c. The final raster is submitted to RTP prepare 25 and the page layout is kept in the job layout database 73.
5. RTP prepare 25 converts raster to RTP 14.
6. RTP is distributed and stored to RTP storage 26. Each process/print-station keeps only some color separations, while others are distributed to RTP storage residing to other process/print stations.

In page level parallelism scenario (disclosed hereunder) CJF 41 created for a single job is split among multiple RIP nodes 42. In the case of job level parallelism (used today) multiple RIP nodes 42 are deployed as well, however, in this case each of the multiple RIP nodes processes a different job represented by a different PDL 13.

The rasterization process is based on CJF 41 and on rules information 78 that is received from composition engine 61 as well as on previously stored reusable PDL elements 54. The rules information 78 is a set of parameters that affect job rasterization. Some rules affect the entire job, while some rules affect just individual pages. The example of rules include resolution, page orientation, page scaling, color. The rules information 78 together with the imposition information 79 provided by the imposition engine 61 comprises the job composition requirement.

Each RIP 23 receives CJF 41, chunk-by-chunk, and each CJF chunk may include rules. RIP loads PDL data (according to CJF), interprets and rasterizes PDL data according to rules. When the RIP 23 encounters a reusable element placement, it performs the following steps:

1. RIP checks if the received PDL element 54 was previously rasterized by either of the RIPs. It includes checking of the raster-parameters such as color transformation matrix (CTM) or PDL element BoundingBox.
2. In the case that the element was previously rasterized on any of RIP nodes 42, the RIP skips rasterization.
3. If the element was not previously rasterized and none of the RIPs started it rasterization, the RIP rasterizes the element and passes the results to RTP prepare 25.
4. If the element was not previously rasterized, but another RIP started it rasterization, the RIP waits for the completion of the element rasterization by the other RIP. Optionally the RIP will not wait, but will raster the element without sharing it with other RIPs, this might be needed at time for optimization purposes.
5. The remaining PDL data is rasterized as a non-reusable element and raster is passed over to RTP prepare 25.

RTP prepare 25 converts raster to RTP. RTP is stored in the RTP storage 26.

As is described in FIG. 7, the system comprises a plurality of process/print controllers 75. Each process/print controller 75 comprises RIP 23, RTP prepare 25, and RTP storage 26. RTP 14 can be prepared by RTP prepare 25 of process/print controller 76 and sent to process/print controller 77 for printing. Alternatively RTP 14 is generated by process/print controller 77 and will be used for printing by process/print controller 76. The data feeder and print manager 55 is responsible for merging RTP elements 14 into bitmaps and sending bitmaps via video interface 15 to digital printer 52.

The invention has been described in detail with particular reference to certain preferred embodiments thereof, but it will be understood that variations and modifications can be effected within the scope of the invention.

PARTS LIST 11 frontend
12 backend
13 page description language (PDL) job
14 ready-to-print (RTP)
15 video interface
21 spool disk
22 input
23 raster image processing (RIP)
24 image processing components
25 RTP prepare
26 RTP storage
27 data feeder
28 merger and printer interface boards
31 job storage
32 multiple frontend nodes
33 RTP storages
34 multiple backend node
35 job organizers
41 common job file (CJF) format
42 multiple RIP nodes
43 multiple mergers
51 PDL resource cache
52 digital printer
53 color channels
54 PDL elements
55 data feeder and print manager
61 composition engine
71 spool submission by external clients
72 work disk
73 job layout service and database
74 CJF chunks 75 process/print controller
76 process/print controller #1
77 process/print controller #2
78 rules information
79 imposition information

The invention claimed is:

1. A method for distribution of a print job for digital printing by distributing elements of said print job wherein said print job comprises at least one individual page between a plurality of processing means comprising the steps of:
 a) providing a print job reference file wherein said print job reference file comprises references to shared resources to be processed in accordance with at least one of said individual pages;
 b) providing job composition requirements;
 c) preparing said print job reference file according to said job composition requirements for job splitting;
 d) splitting said print job reference file into a plurality of segments wherein said segments are generated according to availability of said processing means;
 e) distributing said segments to said processing means;
 f) processing and generating a plurality of ready to print elements wherein said shared resource is provided to a first processor for processing and said shared resource is processed by a second processor, then the first processor waits for said second processor to complete the processing of said shared resource;
 g) generating a ready-to-print (RTP) pages structure according to said job composition requirements and said plurality of ready to print elements; and
 h) creating printer specific data according to said generated ready-to-print (RTP) pages structure.

2. The method of claim 1 comprising:
sending said printer specific data to at least one digital printer.

3. The method of claim 1 wherein said print job reference file comprises references to said individual pages in the said print job.

4. The method of claim 1 wherein said shared resource is provided to a first processor for processing and wherein said shared resource were already processed by a second processor, then processing results of said shared resource is used by first processor without processing the said shared resource again.

5. The method of claim 1 wherein said print job reference file comprises job skeleton information.

6. The method of claim 5 wherein said job skeleton information comprises of at least one of the following parameters selected from a group comprising number of pages per booklet, number of pages per job, page size, page orientation, media type, or a combination thereof.

7. The method of claim 1 wherein said job composition requirements comprises of at least one of the following parameters: digital printer type, print paper size, media type, finisher options, imposition schemes, job to media best fit option; or a combination thereof.

8. The method of claim 7 wherein said digital printer type is roll fed.

9. The method of claim 7 wherein said digital printer type is sheet fed.

10. The method of claim 1 wherein said print job reference file segments represent pages to be executed by dedicated processing means and printed on the front side of the media.

11. The method of claim 1 wherein said print job reference file segments represent pages to be executed by dedicated processing means and printed on the back side of the media.

12. The method of claim 1 wherein said print job reference file is analyzed for processing complexity and the split into segments is performed in accordance with availability and performance of said processing means.

13. The method of claim 12 wherein the analysis for said processing complexity and the split into segments is performed at least once during processing of said print job.

14. The method of claim 1 wherein said ready to print pages structure comprising at least from plurality of ready to print elements and page geometry information.

15. The method of claim 1 wherein said ready to print pages structure comprises page order information.

16. The method of claim 1 wherein said ready to print pages structure comprises destination printer data format.

17. The method of claim 1 wherein said printer specific data is bitmap data.

* * * * *